US011421041B2

(12) United States Patent
Long et al.

(10) Patent No.: US 11,421,041 B2
(45) Date of Patent: Aug. 23, 2022

(54) MULTI-RESPONSE CELLULOSE NANOCRYSTALS-COMPOSITE FILM AND PREPARATION METHOD THEREOF

(71) Applicant: Jiangnan University, Wuxi (CN)

(72) Inventors: Zhu Long, Wuxi (CN); Yahui Meng, Wuxi (CN)

(73) Assignee: Jiangnan University, Wuxi (CN)

( * ) Notice: Subject to any disclaimer, the term of this patent is extended or adjusted under 35 U.S.C. 154(b) by 0 days.

(21) Appl. No.: 17/552,406

(22) Filed: Dec. 16, 2021

(65) Prior Publication Data

US 2022/0106409 A1   Apr. 7, 2022

Related U.S. Application Data

(63) Continuation of application No. PCT/CN2021/111101, filed on Aug. 6, 2021.

(30) Foreign Application Priority Data

Oct. 15, 2020   (CN) .......................... 202011114410.0

(51) Int. Cl.
   *C08B 1/00*      (2006.01)
   *B82Y 30/00*     (2011.01)
   *B82Y 40/00*     (2011.01)
(52) U.S. Cl.
   CPC ............... *C08B 1/003* (2013.01); *B82Y 30/00* (2013.01); *B82Y 40/00* (2013.01)
(58) Field of Classification Search
   None
   See application file for complete search history.

(56) References Cited

U.S. PATENT DOCUMENTS 9,353,313 B2 *  5/2016  Ashurst ................. B82Y 40/00
9,969,108 B2 *  5/2018  Youngblood ........... B29C 70/14
                       (Continued)

FOREIGN PATENT DOCUMENTS

CN       105199123 A  * 12/2015
CN       107268182 A    10/2017
                       (Continued)

OTHER PUBLICATIONS

CN-105199123-A, English translation (Year: 2015).*
(Continued)

*Primary Examiner* — Stefanie J Cohen
(74) *Attorney, Agent, or Firm* — IPro, PLLC

(57) ABSTRACT

The disclosure discloses a multi-response cellulose nanocrystals-composite film and a preparation method thereof, belonging to the technical field of functional materials. The multi-response cellulose nanocrystals-composite film of the disclosure includes cellulose nanocrystals, a deep eutectic solvent and anthocyanins. The deep eutectic solvent is composed of choline chloride and biological sugar. A mass ratio of the choline chloride to the biological sugar is 1-20:1-6. A mass ratio of the cellulose nanocrystals to the deep eutectic solvent to the anthocyanins is 10:0-10:1, and the amount of the deep eutectic solvent is not 0. The preparation method of the composite film of the disclosure is simple and easy to operate, and has the advantages of mild conditions and short time consumption. The multi-response film prepared in the disclosure has humidity and pH detection functions, has the advantages of good flexibility, good reversibility, excellent stability, etc., and can be used as a flexible humidity and pH sensor.

13 Claims, 5 Drawing Sheets

(56) References Cited

U.S. PATENT DOCUMENTS

| | | | | |
|---|---|---|---|---|
| 2008/0194762 A1* | 8/2008 | Sugasaki | ............ | C08G 18/3293 |
| | | | | 524/612 |
| 2018/0119235 A1* | 5/2018 | Talianski | .................. | C08L 1/02 |
| 2019/0133132 A1* | 5/2019 | Ghiladi | .................. | A01N 25/10 |
| 2020/0199305 A1* | 6/2020 | Feng | .......................... | C08J 3/18 |

FOREIGN PATENT DOCUMENTS

| | | | | |
|---|---|---|---|---|
| CN | 108314792 A | | 7/2018 | |
| CN | 109021305 A | * 12/2018 | ........... | B65D 65/466 |
| CN | 110776656 A | | 2/2020 | |
| CN | 111700205 A | | 9/2020 | |
| CN | 112266502 A | | 1/2021 | |
| WO | 2017037349 A1 | | 3/2017 | |
| WO | 2020044210 A1 | | 3/2020 | |

OTHER PUBLICATIONS

CN-109021305-A, English translation (Year: 2018).*
Yahui Meng et. al. "Fabrication of environmental humidity-responsive iridescent films with cellulose nanocrystal/polyols" Carbohydrate Polymers 240 (Apr. 17, 2020) 116281.

* cited by examiner

MULTI-RESPONSE CELLULOSE NANOCRYSTALS-COMPOSITE FILM AND PREPARATION METHOD THEREOF

TECHNICAL FIELD

The disclosure relates to a multi-response cellulose nanocrystals-composite film and a preparation method thereof, belonging to the technical field of functional materials.

BACKGROUND

Cellulose nanocrystals (CNC) are sustainable, renewable and biodegradable, have the characteristics of high strength, high optical transparency and good self-assembly capability, and have attracted extensive attention from scientific researchers. Usually, CNC is extracted from cellulose fibers by acid hydrolysis, mainly including sulfuric acid, hydrochloric acid and phosphoric acid. Among these acids, 64 wt % sulfuric acid hydrolysis, which is the most commonly used method, can produce rod-like CNC with a diameter of 5-10 nm and a length of 100-300 nm with negatively charged sulfuric acid half ester groups on the surface. With a low concentration of CNC, the suspension belongs to the isotropic phase. When the CNC concentration in the suspension reaches the critical concentration of CNC, the suspension begins to show the characteristics of a cholesteric liquid crystal phase. When the CNC concentration in the suspension is higher than the critical concentration of CNC, shear birefringence can be observed through crossed polarizers. As the standing time increases, the suspension spontaneously separates into an upper part (isotropic phase) and a lower part (anisotropic phase). The anisotropic rod-like CNC can self-assemble into a chiral nematic liquid crystal phase in a concentrated solution, and as the solvent evaporates, a cholesteric CNC film can be formed.

The spacing of the CNC suspension is usually in the micron level, and in the evaporation process, the increase of the CNC concentration will lead to the decrease of the pitch, reaching the visible wavelength range and thus making the film appear colored. Many methods (such as addition of electrolyte, ultrasound treatment, adjustment of ionic strength and drying temperature, etc.) can adjust the pitch to control the color of the CNC film. However, due to the high brittleness of CNC, the prepared film is usually extremely fragile. In order to overcome this defect, water-soluble polymers, such as polyethylene glycol (PEG), polyvinyl alcohol (PVA), water-based polyurethane (WPU) and polyvinylpyrrolidone (PVP), have been used to reduce the brittleness of the CNC film while maintaining the unique color of the CNC film. In addition, 1-allyl-3-methylimidazolium chloride (AmimCl) has also been used to increase the flexibility of the film while maintaining the iridescent color of the CNC film. Usually, in order to obtain a flexible and color-adjustable iridescent CNC film, ultrasound treatment is essential when introducing the above-mentioned polymers as a plasticizer. However, excessive ultrasound will irreversibly inhibit the self-assembly of CNC, resulting in the disappearance of the film color.

Therefore, a simple method is crucial for the preparation of an iridescent CNC film with good flexibility and color-adjustability.

SUMMARY

In order to solve at least one of the problems above, in the disclosure, cellulose nanocrystals (CNC) as a substrate, a deep eutectic solvent (DES) as a plasticizer and a moisture absorbent, and anthocyanins as a pH indicator are stirred at room temperature until the solution is mixed uniformly, then the solution is casted on a polytetrafluoroethylene tray, and drying is carried out at room temperature to obtain a multi-response cellulose nanocrystals-composite film. The deep eutectic solvent can be used both as a plasticizer to improve the flexibility of the CNC film, and as a moisture absorbent to adjust the photonic band gap of the composite film.

A first objective of the disclosure is to provide a multi-response cellulose nanocrystals-composite film, including cellulose nanocrystals (CNC), a deep eutectic solvent (DES) and anthocyanins. The deep eutectic solvent is composed of choline chloride and biological sugar. A mass ratio of the cellulose nanocrystals (CNC) to the deep eutectic solvent (DES for short) to the anthocyanins is 10:0-10:1, and the amount of the deep eutectic solvent is not 0.

In an embodiment of the disclosure, a mass ratio of the choline chloride to the biological sugar is 1-20:1-6, more preferably 2:1.

In an embodiment of the disclosure, a preparation method of the deep eutectic solvent (DES) includes: mixing the choline chloride and the biological sugar at the mass ratio of 1-20:1-6, and stirring the mixture at 70-90° C. for 8-12 h to obtain a colorless transparent solution, that is, the deep eutectic solvent (DES).

In an embodiment of the disclosure, a preparation method of the deep eutectic solvent includes: mixing choline chloride and glucose at a mass ratio of 2:1, and heating and stirring the mixture in an 80° C. oil bath pan for 10 h to obtain a colorless transparent solution, that is, the deep eutectic solvent (DES).

In an embodiment of the disclosure, the biological sugar includes one or more of glucose and sucrose.

A second objective of the disclosure is to provide a method for preparing the multi-response cellulose nanocrystals-composite film of the disclosure, including the following steps:

(1) carrying out acid hydrolysis on microcrystalline cellulose to obtain a cellulose nanocrystals suspension; then concentrating the cellulose nanocrystals suspension to obtain a cellulose nanocrystals concentrated suspension;

(2) adding a deep eutectic solvent and anthocyanins to the cellulose nanocrystals concentrated suspension, and uniformly mixing the mixture to obtain a film forming solution; and (3) carrying out film casting with the film forming solution, and carrying out drying to obtain the multi-response cellulose nanocrystals-composite film.

The deep eutectic solvent is composed of choline chloride and biological sugar. A mass ratio of the cellulose nanocrystals (CNC) to the deep eutectic solvent (DES) to the anthocyanins is 10:0-10:1, and the amount of the deep eutectic solvent is not 0.

In an embodiment of the disclosure, the acid hydrolysis in step (1) is to carry out acid hydrolysis after the microcrystalline cellulose is added to a sulfuric acid solution. A mass/volume ratio of the microcrystalline cellulose to the sulfuric acid solution is 10-20 g:100 mL, and the sulfuric acid solution has a concentration of 60-65 wt %. More preferably, the acid hydrolysis is carried out after 11 g of microcrystalline cellulose is added to 100 mL of a sulfuric acid solution having a concentration of 64 wt %.

In an embodiment of the disclosure, the cellulose nanocrystals suspension in step (1) has a concentration of 0.5-0.8 wt %.

In an embodiment of the disclosure, the concentrated suspension in step (1) is a suspension concentrated to a solid content of 5-8 wt %.

In an embodiment of the disclosure, the uniformly mixing in step (2) is stirring at 200-600 rpm for 10-60 min.

In an embodiment of the disclosure, the film casting in step (3) is to cast the film forming solution on a polytetrafluoroethylene tray, and the film thickness is 50-60 μm, more preferably 52.8-54.1 μm.

In an embodiment of the disclosure, the drying in step (3) is drying at room temperature (20-30° C.) for 10-30 h.

In an embodiment of the disclosure, the multi-response is humidity and pH dual-response. The humidity is in a range of a relative humidity (RH) of 30%-95%; and the pH is in a range of 2-12.

A third objective of the disclosure is to provide application of the multi-response cellulose nanocrystals-composite film of the disclosure in acidic and alkaline gas detection and humidity sensors.

A fourth objective of the disclosure is to provide a flexible humidity and pH dual-response sensor, including the multi-response cellulose nanocrystals-composite film of the disclosure.

The disclosure has the following beneficial effects:

(1) The preparation process of the cellulose nanocrystals suspension in the disclosure is simple and easy to operate.

(2) The deep eutectic solvent used in the disclosure is environmentally friendly, and can be used both as a plasticizer to improve the flexibility of the film, and as a moisture absorbent to endow the cellulose nanocrystals film with different colors.

(3) The anthocyanins used in the disclosure are safe and non-toxic.

(4) The multi-response film obtained in the disclosure has reversibility and multi-response functions.

DETAILED DESCRIPTION

Figure 1:
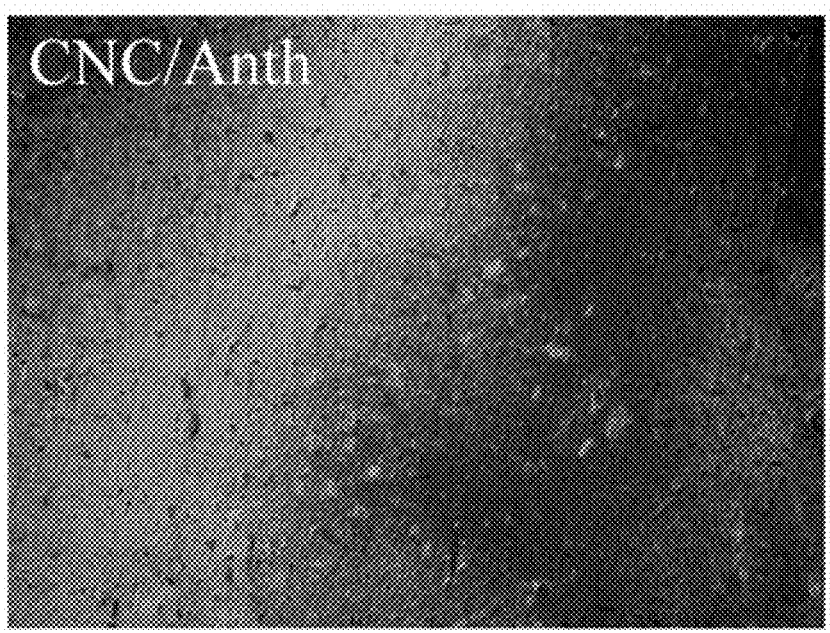
FIG. 1 is a polarizing microscope image of CNC/Anth.
Figure 2:
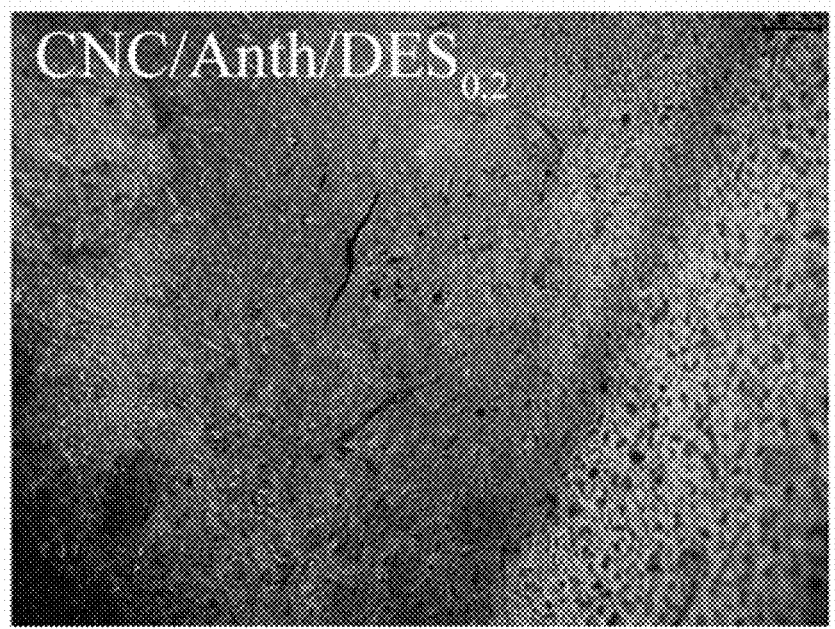
FIG. 2 is a polarizing microscope image of CNC/Anth/$DES_{0.2}$.
Figure 3:
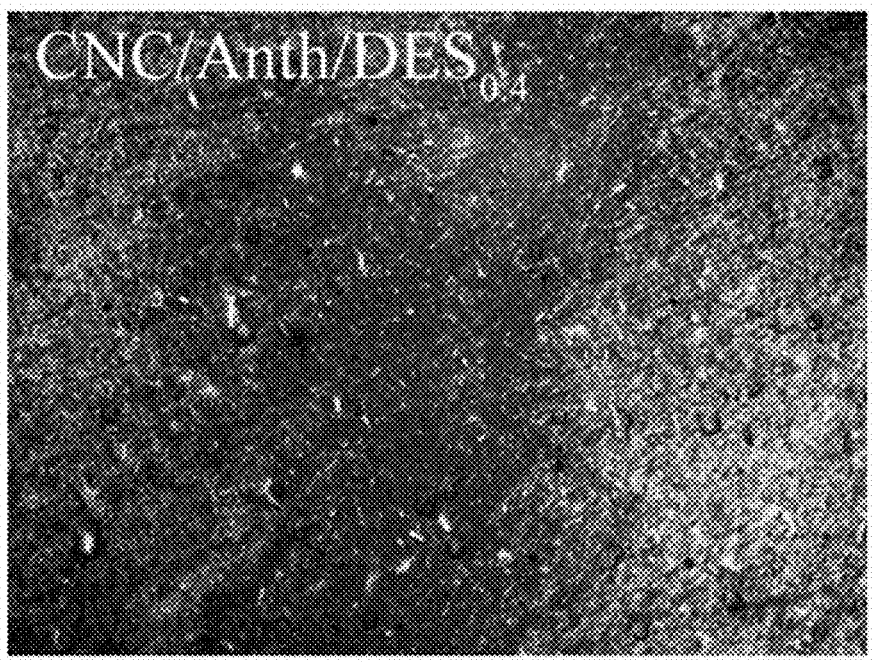
FIG. 3 is a polarizing microscope image of CNC/Anth/$DES_{0.4}$.
Figure 4:
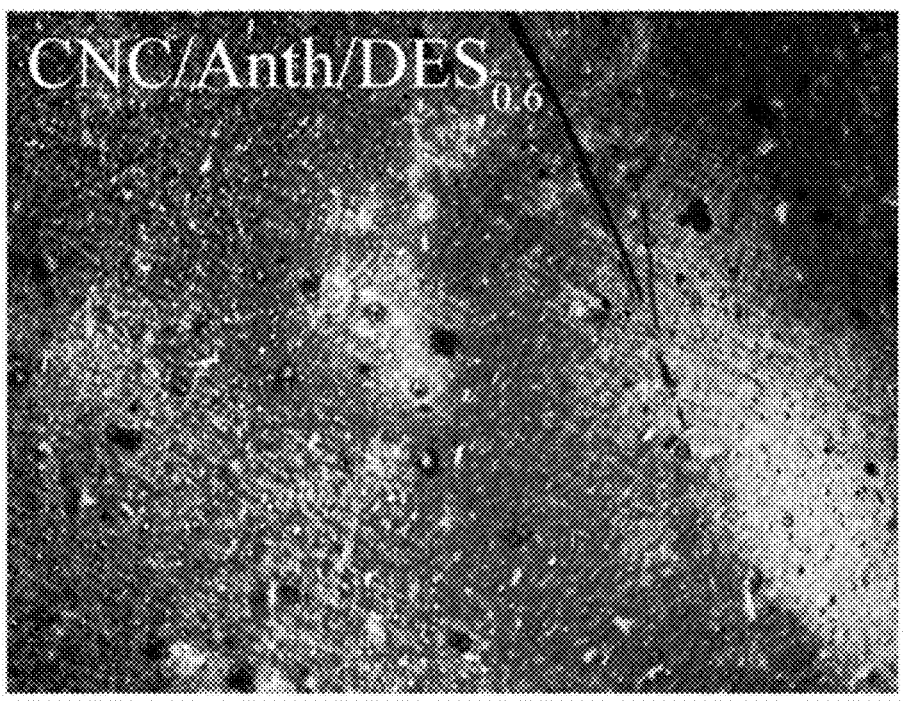
FIG. 4 is a polarizing microscope image of CNC/Anth/$DES_{0.6}$.
Figure 5:
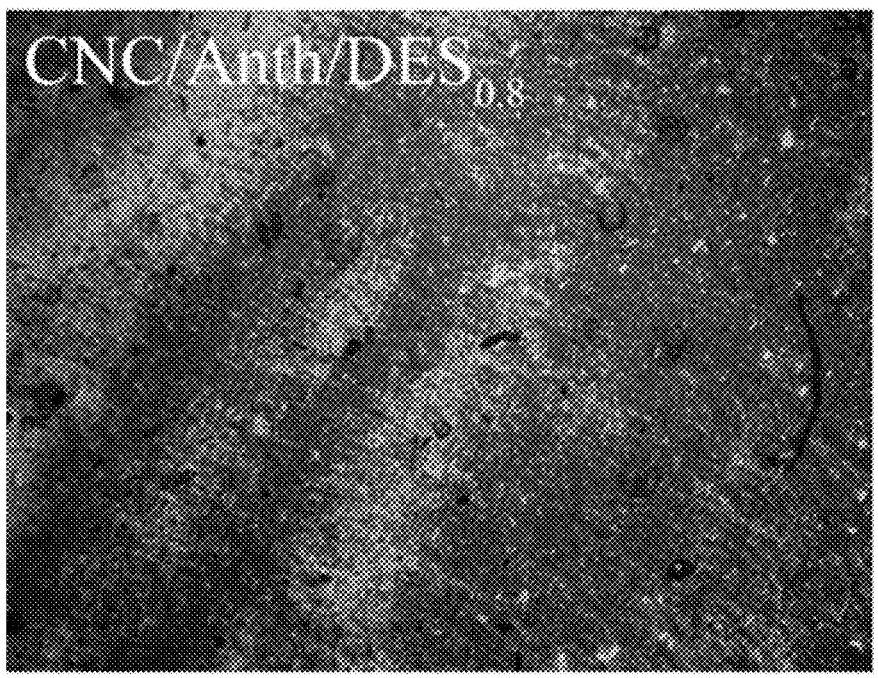
FIG. 5 is a polarizing microscope image of CNC/Anth/$DES_{0.8}$.
Figure 6:
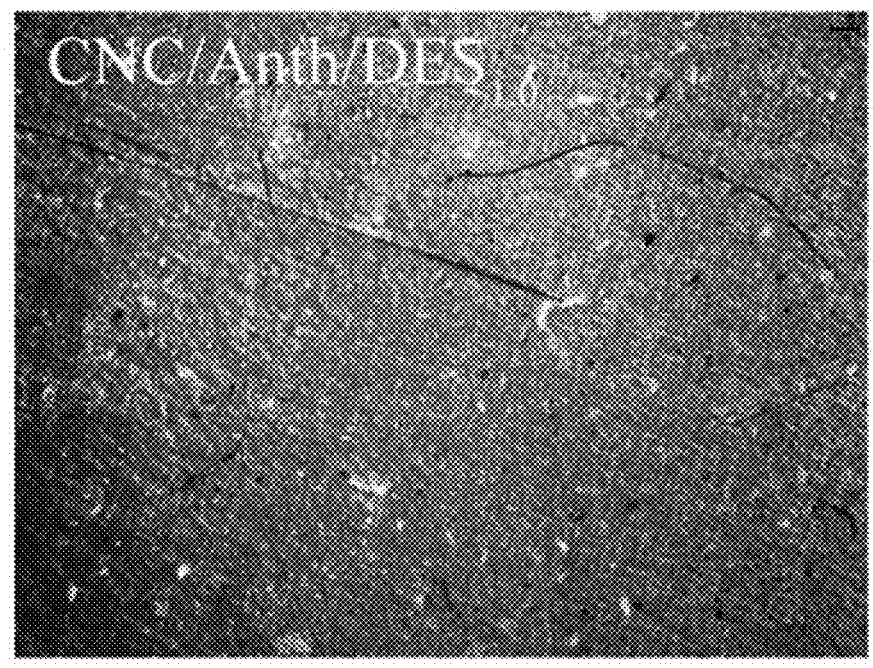
FIG. 6 is a polarizing microscope image of CNC/Anth/$DES_{1.0}$.

Preferred examples of the disclosure will be described below. It should be understood that the examples are intended to better explain the disclosure and are not intended to limit the disclosure.

Test Methods:

Tensile Strength and Elongation at Break:

Under the conditions of 25° C. and a humidity RH of 60%, the composite film is subjected to mechanical strength testing using a BZ2.5/TNIS Zwick material tester (Zwick, Germany). The specimen size is 15×100 mm, the chuck distance is 50 mm, the tensile speed is 50 mm/min, and each specimen is tested at least 5 times.

Color Parameter Testing:

An image of the film is taken using an RX100 III camera, and color parameters of the film are measured using a portable colorimeter 6 (Xrite2600d, MI, 101, USA).

Example 1

A method for preparing a multi-response cellulose nanocrystals-composite film includes the following steps:

(1) Acid hydrolysis was carried out after 11 g of microcrystalline cellulose was added to 100 mL of a sulfuric acid solution having a concentration of 64 wt % to obtain a cellulose nanocrystals suspension having a concentration of 0.5 wt %. Then the cellulose nanocrystals suspension was evaporated at room temperature to obtain a cellulose nanocrystals concentrated suspension with a solid content of 5 wt % (the amount of cellulose nanocrystals (CNC) in the concentrated suspension was 1 g).

(2) 0.1 g of anthocyanins (Anth) and different amounts (0, 0.2, 0.4, 0.6, 0.8 and 1.0 g) of deep eutectic solvent (DES) were added to the cellulose nanocrystals concentrated suspension. Each of the mixtures was stirred uniformly at room temperature to obtain a film forming solution. A preparation method of the deep eutectic solvent included: choline chloride and glucose at a mass ratio of 2:1 were mixed, and the mixture was heated and stirred in an 80° C. oil bath pan for 10 h to obtain a colorless transparent solution, that is, the deep eutectic solvent.

(3) The film forming solution was cast on a polytetrafluoroethylene tray, and drying was carried out at room temperature for 24 h to obtain the multi-response cellulose nanocrystals-composite film, respectively marked as CNC/Anth, CNC/Anth/$DES_{0.2}$, CNC/Anth/$DES_{0.4}$, CNC/Anth/$DES_{0.6}$, CNC/Anth/$DES_{0.8}$ and CNC/Anth/$DES_{1.0}$.

The obtained multi-response cellulose nanocrystals-composite films were subjected to performance testing. The test results are as follows:

Table 1 shows test results of color parameters and mechanical properties of response films with different amounts of the deep eutectic solvent added. As can be seen from Table 1, due to high rigidity of the CNC, the CNC/Anth film is very brittle, so it is difficult to carry out measurements by in-plane tensile testing. As the DES content increases, the tensile strength of the response film decreases, and the elongation at break increases. The reason is that the plasticizing effect of DES makes the movement of CNC molecules unrestricted, thereby leading to the increase in the elongation at break of the CNC composite film. As the DES content increases, the film color gradually changes from purple to light red.

TABLE 1

Color parameters and mechanical properties of response films with different amounts of deep eutectic solvent added

| Film | Thickness (μm) | Tensile strength (MPa) | Elongation at break (%) | Color | L* | a* | b* |
|---|---|---|---|---|---|---|---|
| CNC/Anth | 52.8 | — | — | Purple | 53.27 | 25.31 | −26.56 |
| CNC/Anth/DES$_{0.2}$ | 52.6 | 9.036 | 1.326 | Light purple | 60.97 | 16.10 | −26.01 |
| CNC/Anth/DES$_{0.4}$ | 52.9 | 7.25 | 2.716 | Light blue | 65.31 | 1.34 | −13.42 |
| CNC/Anth/DES$_{0.6}$ | 53.2 | 4.974 | 4.375 | Yellow | 68.73 | −1.25 | 17.19 |
| CNC/Anth/DES$_{0.8}$ | 53.0 | 2.172 | 6.124 | Orange | 70.67 | 6.59 | 21.99 |
| CNC/Anth DES$_{1.0}$ | 54.1 | 1.051 | 7.341 | Light red | 67.90 | 14.67 | 15.30 |

Notes:
"—" means that the measurement cannot be carried out by in-plane tensile testing.

Figure 7:
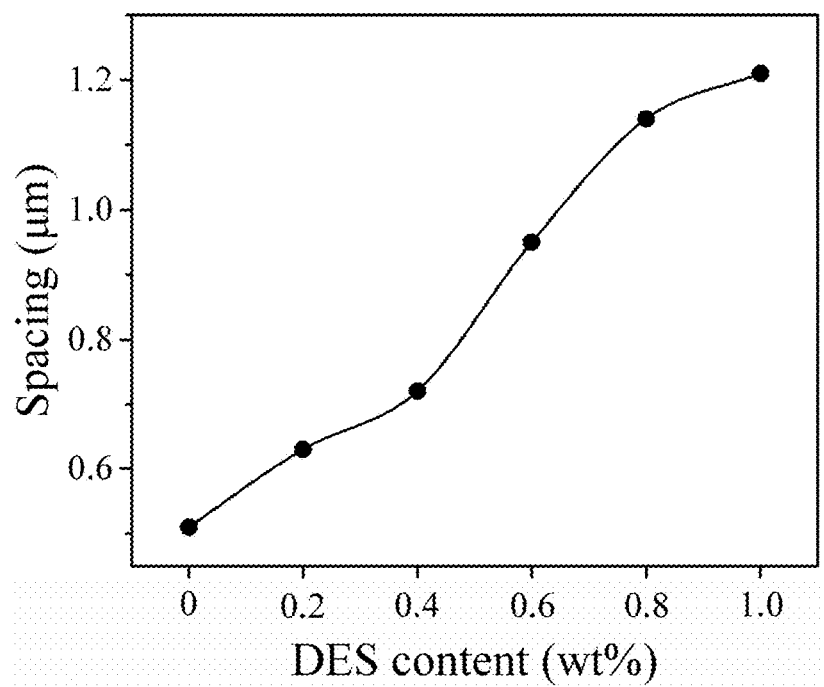
FIG. 7 is a graph of a DES content as a function of a spacing of a fingerprint texture of CNC/Anth, CNC/Anth/$DES_{0.2}$, CNC/Anth/$DES_{0.4}$, CNC/Anth/$DES_{0.6}$, CNC/Anth/$DES_{0.8}$ and CNC/Anth/$DES_{1.0}$.

FIG. 1 to FIG. 6 show polarizing microscope images of CNC/Anth, CNC/Anth/DES$_{0.2}$, CNC/Anth/DES$_{0.4}$, CNC/Anth/DES$_{0.6}$, CNC/Anth/DES$_{0.8}$ and CNC/Anth/DES$_{1.0}$. As can be seen from FIG. 1 to FIG. 6, the six CNC composite films all show a domain texture and a fingerprint texture. The spacings of the fingerprint texture and the chiral nematic periodic structure vary with the amount of DES added. The relationship between the spacing of the fingerprint texture of the film and the amount of DES added is shown in FIG. 7. As can be seen from FIG. 7, as the DES content increases, the spacing of the fingerprint texture of the composite film increases, resulting in a red shift of the composite film.

Saturated salt solutions of CaCl$_2$, K$_2$CO$_3$ and NaCl and distilled water were placed in closed vessels to control different humidity conditions (30% RH, 50% RH, 75% RH and 95% RH). 2 cm×2 cm CNC/Anth, CNC/Anth/DES$_{0.2}$, CNC/Anth/DES$_{0.4}$, CNC/Anth/DES$_{0.6}$, CNC/Anth/DES$_{0.8}$ and CNC/Anth/DES$_{1.0}$ response films were placed into the above vessels, then the vessels were sealed, and the water absorption rate of the film was calculated by weighing the humidity response films. Water absorption rate (%)=(weight of film after water absorption−weight of original film)/weight of original film×100%.

Figure 8:
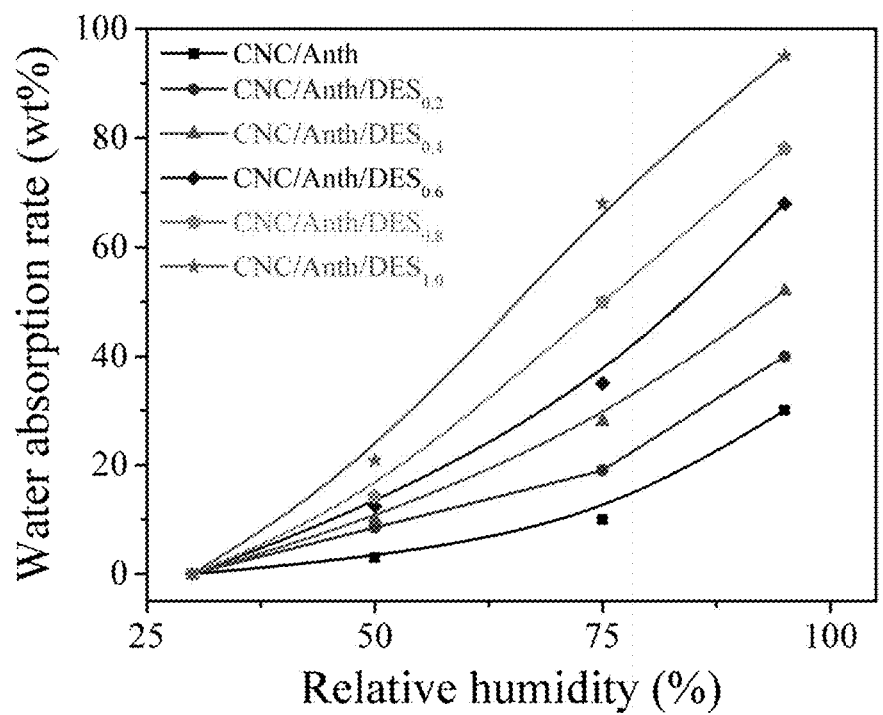
FIG. 8 is a graph showing a water absorption rate of CNC/Anth, CNC/Anth/$DES_{0.2}$, CNC/Anth/$DES_{0.4}$, CNC/Anth/$DES_{0.6}$, CNC/Anth/$DES_{0.8}$ and CNC/Anth/$DES_{1.0}$.

FIG. 8 is a graph showing water absorption rates of CNC/Anth, CNC/Anth/DES$_{0.2}$, CNC/Anth/DES$_{0.4}$, CNC/Anth/DES$_{0.6}$, CNC/Anth/DES$_{0.8}$ and CNC/Anth/DES$_{1.0}$. As can be seen from FIG. 8, when the relative humidity is lower than 75%, the water absorption rate of the CNC film is less than 10 wt %. Due to the addition of the DES, the multi-response cellulose nanocrystals-composite film has a higher water absorption capacity. The reason may be that the DES is a hydrophilic plasticizer, which increases the free volume of the CNC and thus causes the CNC to absorb more water.

Taking the CNC/Anth/DES$_{0.4}$ film as an example, under different humidity conditions, the color changes of the multi-response cellulose nanocrystals-composite film are shown in Table 2. As can be seen from Table 2, as the relative humidity increases from 30% to 95%, the CNC/Anth/DES$_{0.4}$ composite film shows a higher L* value, which indicates that the composite film has higher luminance. The a* value decreases from 1.34 to −8.12 and the b* increases from −13.42 to 13.97, which indicates that as the relative humidity increases, the red color decreases and the yellow color increases. Besides, the ΔE* value of the composite film is greater than 9, which indicates that the color difference between the composite films under different humidity conditions is very obvious and easy to distinguish with naked eyes.

TABLE 2

Color changes of CNC/Anth/DES$_{0.4}$ film under different humidity conditions

| Humidity (%) | Color | L* | a* | b* | ΔE |
|---|---|---|---|---|---|
| 30 | Light blue | 65.31 | 1.34 | −13.42 | — |
| 50 | Cyan | 66.09 | −15.18 | −7.81 | 17.45 |
| 75 | Light green | 69.84 | −13.91 | 6.88 | 15.21 |
| 95 | Yellow-green | 70.01 | −8.12 | 13.97 | 9.15 |

Notes:
— means no need for comparison, and ΔE means the color difference between adjacent humidities.

A 2 cm×2 cm CNC/Anth/DES$_{0.4}$ film was placed under the humidity condition of 30% RH, the color of the CNC/Anth/DES$_{0.4}$ film was recorded and the color parameters of the CNC/Anth/DES$_{0.4}$ film were measured. Then the film was placed under the humidity condition of 95% RH, the color of the CNC/Anth/DES$_{0.4}$ film was recorded and the color parameters of the CNC/Anth/DES$_{0.4}$ film were measured. The above operations were repeated ten times or more. The CNC/Anth/DES$_{0.4}$ film was stored under 25° C. and 30% RH. Every other week, the CNC/Anth/DES$_{0.4}$ film was tested for humidity response, and the color and parameter values of the CNC/Anth/DES$_{0.4}$ film were recorded.

Figure 9:
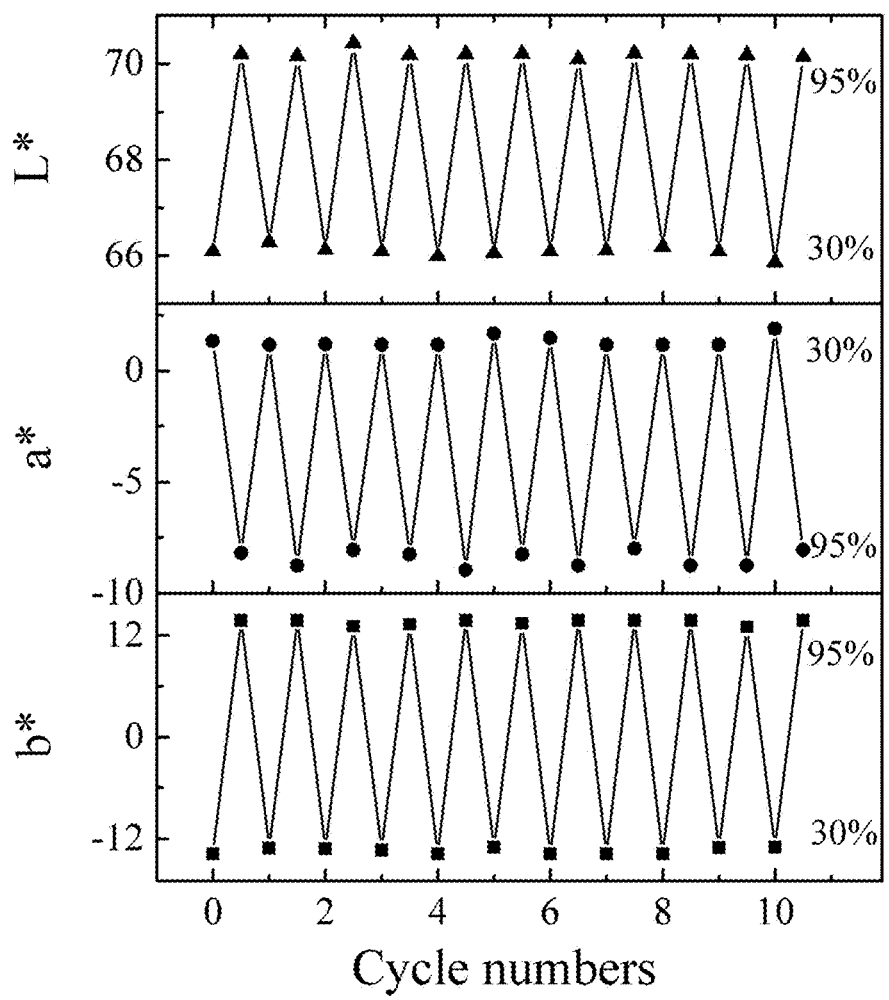
FIG. 9 is a graph showing cycling stability of CNC/Anth, CNC/Anth/$DES_{0.2}$, CNC/Anth/$DES_{0.4}$, CNC/Anth/$DES_{0.6}$, CNC/Anth/$DES_{0.8}$ and CNC/Anth/$DES_{1.0}$.

The cycling stability of the CNC/Anth/DES$_{0.4}$ film is shown in FIG. 9. As can be seen from FIG. 9, under the conditions of RH 30% and RH 95%, within 10 cycles, the changes in L*, a* and b* of the CNC/Anth/DES$_{0.4}$ film in response to multiple cycles are particularly small, which indicates that the composite film has a good reversible stability.

A 2 cm×2 cm CNC/Anth/DES$_{0.4}$ film was placed in buffer solutions with different pH values, the color of the CNC/Anth/DES$_{0.4}$ film was recorded, and the color parameters of the CNC/Anth/DES$_{0.4}$ film were measured, as shown in Table 3.

TABLE 3

Color changes of CNC/Anth/DES$_{0.4}$ film under different pH conditions

| pH | Original | 2 | 4 | 6 | 8 | 10 | 12 |
|---|---|---|---|---|---|---|---|
| Color | Yellow | Green | Light green | Yellow-brown | Brown | Yellow-green | Green |
| L* | 68.73 | 63.56 | 70.43 | 56.98 | 45.51 | 58.41 | 46.15 |
| a* | −1.25 | −21.12 | −18.01 | −3.24 | 10.37 | −6.53 | −25.10 |
| b* | 17.19 | 16.00 | 11.23 | 15.76 | 6.62 | 21.73 | 17.05 |
| ΔE | — | 20.57 | 8.93 | 20.48 | 20.01 | 26.08 | 22.74 |

Notes:
"—" means no need for comparison, and ΔE is the color difference between adjacent pH values.

Comparative Example 1

The deep eutectic solvent in Example 1 was adjusted to choline chloride and glycerin, the amount was 0.4 g, the rest was the same as in Example 1, and a composite film was obtained.

Comparative Example 2

The deep eutectic solvent in Example 1 was adjusted to choline chloride, the amount was 0.4 g, the rest was the same as in Example 1, and a composite film was obtained.

Comparative Example 3

The deep eutectic solvent in Example 1 was adjusted to glucose, the amount was 0.4 g, the rest was the same as in Example 1, and a composite film was obtained.

Comparative Example 4

The ratio of the choline chloride to the glucose in Example 1 was adjusted to 1:2, the amount was 0.4 g, the rest was the same as in Example 1, and a composite film was obtained.

Comparative Example 5

The amount of the cellulose nanocrystals (CNC) used in Example 1 was adjusted to 0.5 g, the rest was the same as in Example 1, and a composite film was obtained.

The composite films obtained in Comparative Examples 1 to 5 were subjected to performance testing. The test results are as follows.

As can be seen from Table 4, the addition of the choline chloride leads to a decrease in both the tensile strength and the elongation at break of the composite film. When the choline chloride/glycerin are used as the deep eutectic solvent, the tensile strength of the composite film slightly increases, but during the storage process of the composite film, the glycerin is easily separated out from the composite film, which makes the composite film easily become aged and brittle. When the glucose is added, due to the rigidity of the CNC, the strength testing cannot be carried out. When the ratio of the choline chloride to the glucose is 1:2, the tensile strength of the composite film slightly increases, and the elongation at break slightly decreases. When the CNC content is 0.5 g, the thickness of the composite film decreases, the tensile strength decreases, and the elongation at break increases.

TABLE 4

Color parameters and mechanical properties of composite films obtained in Comparative Examples 1 to 5

| Comparative Example | Thickness (μm) | Tensile strength (MPa) | Elongation at break (%) | Color | Color parameters L* | a* | b* |
|---|---|---|---|---|---|---|---|
| 1 | 52.9 | 6.89 | 2.502 | Light blue | 64.23 | 1.52 | −13.10 |
| 2 | 52.4 | 5.78 | 2.110 | Blue | 48.94 | 14.10 | −52 |
| 3 | 52.8 | — | — | Light purple | 56.45 | 15.98 | −25.47 |
| 4 | 52.9 | 7.29 | 2.620 | Blue | 48.25 | 6.97 | −30.24 |
| 5 | 26 | 3.21 | 1.46 | Purplish red | 52.58 | 29.31 | −20.78 |

Notes:
"—" means that the measurement cannot be carried out by in-plane tensile testing.

As can be seen from Table 5, the color difference of the films prepared in Comparative Examples 1 to 4 under different humidity conditions is less than the color difference of the CNC/Anth/DES$_{0.4}$ film. Moreover, the color difference of the films obtained in Comparative Example 2 and Comparative Example 3 under higher humidity conditions is less than 5, so they cannot meet the requirements of intelligent colorimetry. The film prepared in Comparative Example 5 has no humidity response effect. Due to the low CNC content, no photon structure can be formed in the self-assembly process, so the film cannot respond to humidity.

TABLE 5

Color changes ΔE of composite films obtained in Comparative Examples 1 to 5 under different humidity conditions

| Humidity (%) | Comparative Example 1 | Comparative Example 2 | Comparative Example 3 | Comparative Example 4 | Comparative Example 5 |
| --- | --- | --- | --- | --- | --- |
| 30 | — | — | — | — | — |
| 50 | 13.10 | 10.21 | 6.12 | 15.10 | — |
| 75 | 7.85 | 6.52 | 4.56 | 12.24 | — |
| 95 | 5.01 | 4.81 | 4.78 | 6.19 | — |

Notes:
"—" means no color change, and ΔE means the color difference between adjacent humidities.

As can be seen from Table 6, the color difference of the composite films prepared in Comparative Examples 1 to 5 under different pH conditions is small, so they cannot meet the requirements of intelligent colorimetry.

TABLE 6

Color changes ΔE of composite films obtained in Comparative Examples 1 to 5 under different pH conditions

| pH | Comparative Example 1 | Comparative Example 2 | Comparative Example 3 | Comparative Example 4 | Comparative Example 5 |
| --- | --- | --- | --- | --- | --- |
| Original | — | — | — | — | — |
| 2 | 14.29 | 15.36 | 2.11 | 16.24 | 5.42 |
| 4 | 4.35 | 4.79 | 2.43 | 5.12 | 3.51 |
| 6 | 3.27 | 4.21 | 1.89 | 4.57 | 2.99 |
| 8 | 3.01 | 3.97 | 1.62 | 4.61 | 3.12 |
| 10 | 4.65 | 4.65 | 4.26 | 4.97 | 2.74 |
| 12 | 5.24 | 5.66 | 5.31 | 6.25 | 6.23 |

Notes:
"—" means no need for comparison, and ΔE means the color difference between adjacent pH values.

What is claimed is:

1. A multi-response cellulose nanocrystals-composite film, comprising:
   cellulose nanocrystals,
   a deep eutectic solvent, and
   anthocyanins,
   wherein the deep eutectic solvent is composed of choline chloride and biological sugar;
   wherein a mass ratio of the cellulose nanocrystals to the deep eutectic solvent to the anthocyanins is 10:0-10:1; and
   wherein an amount of the deep eutectic solvent is not 0.

2. The multi-response cellulose nanocrystals-composite film according to claim 1, wherein a mass ratio of the choline chloride to the biological sugar is 1-20:1-6.

3. The multi-response cellulose nanocrystals-composite film according to claim 1, wherein the biological sugar comprises glucose and sucrose.

4. The multi-response cellulose nanocrystals-composite film according to claim 1, wherein a preparation method of the deep eutectic solvent comprises:
   mixing the choline chloride and the biological sugar at the mass ratio of 1-20:1-6, and
   stirring the mixture at 70° C. to 90° C. for 8 hours to 12 hours to obtain a colorless transparent solution, that is, the deep eutectic solvent.

5. The multi-response cellulose nanocrystals-composite film according to claim 2, wherein the mass ratio of the choline chloride to the biological sugar is 2:1.

6. A method for preparing the multi-response cellulose nanocrystals-composite film according to claims 1, comprising the following steps:
   carrying out acid hydrolysis on microcrystalline cellulose to obtain a cellulose nanocrystals suspension;
   concentrating the cellulose nanocrystals suspension to obtain a cellulose nanocrystals concentrated suspension;

adding the deep eutectic solvent and the anthocyanins to the cellulose nanocrystals concentrated suspension, uniformly mixing the mixture to obtain a film forming solution;

film casting the film forming solution, and drying to obtain the multi-response cellulose nanocrystals-composite film.

7. The method according to claim 6, wherein the acid hydrolysis is performed after the microcrystalline cellulose is added to a sulfuric acid solution, wherein a mass/volume ratio of the microcrystalline cellulose to the sulfuric acid solution is 10 g to 20 g:100 mL, and wherein the sulfuric acid solution has a concentration of 60 wt % to 65 wt %.

8. The method according to claim 6, wherein the cellulose nanocrystals suspension has a concentration of 0.5 wt % to 0.8 wt %.

9. The method according to claim 6, wherein the concentrated suspension is a suspension concentrated to a solid content of 5 wt % to 8 wt %.

10. The method according to claim 6, wherein the film casting is casting the film forming solution on a polytetrafluoroethylene tray, and a film thickness is 50 μm to 60 μm.

11. The method according to claim 6, wherein the multi-response is humidity and pH dual-response, and the humidity is in a range of a relative humidity (RH) of 30% to 95%; and wherein the pH is in a range of 2 to 12.

12. A flexible humidity and pH dual-response sensor, comprising the multi-response cellulose nanocrystals-composite film according to claim 1.

13. The multi-response cellulose nanocrystals-composite film according to claim 1, wherein the biological sugar comprises glucose or sucrose.

* * * * *